(12) United States Patent
Baker

(10) Patent No.: US 8,540,177 B2
(45) Date of Patent: Sep. 24, 2013

(54) VERTICAL FEED MIXER HAVING CUTOUT EDGE

(75) Inventor: John Baker, Sarnia (CA)

(73) Assignee: Penta TMR Inc., Petrolia (CA)

( * ) Notice: Subject to any disclaimer, the term of this patent is extended or adjusted under 35 U.S.C. 154(b) by 320 days.

(21) Appl. No.: 12/949,759

(22) Filed: Nov. 18, 2010

(65) Prior Publication Data

US 2011/0284672 A1 Nov. 24, 2011

Related U.S. Application Data

(60) Provisional application No. 61/263,047, filed on Nov. 20, 2009.

(51) Int. Cl.
*B02C 19/22* (2006.01)

(52) U.S. Cl.
USPC .............................. 241/101.761; 241/260.1

(58) Field of Classification Search
USPC .......... 241/260.1, 101.76, 101.761; 366/319, 366/603
See application file for complete search history.

(56) References Cited

U.S. PATENT DOCUMENTS

| | | | |
|---|---|---|---|
| 3,997,146 A | 12/1976 | Kline | |
| 4,896,970 A | 1/1990 | Schuler | |
| 5,148,999 A | 9/1992 | Curfman et al. | |
| 5,439,182 A | 8/1995 | Sgariboldi | |
| 5,443,588 A | 8/1995 | Loppoli | |
| 5,456,416 A | 10/1995 | Hartwig | |
| 5,553,937 A * | 9/1996 | Faccia | 366/302 |
| 5,590,963 A | 1/1997 | Schuler | |
| 5,601,362 A | 2/1997 | Schuler | |
| 5,615,839 A | 4/1997 | Hartwig | |
| 5,647,665 A | 7/1997 | Schuler | |
| 5,863,122 A | 1/1999 | Tamminga | |
| 6,273,350 B1 | 8/2001 | Kirby et al. | |
| 6,328,465 B1 | 12/2001 | Tamminga | |
| 6,817,752 B2 | 11/2004 | Tolle | |
| 6,863,433 B2 | 3/2005 | Knight | |
| 6,905,238 B2 | 6/2005 | Albright et al. | |
| 6,923,393 B1 | 8/2005 | Neier et al. | |
| 7,004,617 B2 | 2/2006 | Albright et al. | |
| 7,347,615 B2 | 3/2008 | van der Plas | |
| 7,347,616 B2 | 3/2008 | Albright | |
| 7,938,575 B2 * | 5/2011 | Liet | 366/314 |
| 8,342,738 B2 * | 1/2013 | Neier et al. | 366/314 |
| 2004/0252583 A1 | 12/2004 | Van Der Plas | |
| 2007/0274151 A1 | 11/2007 | Albright | |

FOREIGN PATENT DOCUMENTS

| | | |
|---|---|---|
| CA | 2307962 | 11/2001 |
| GB | 2310793 | 9/1997 |
| WO | 2007083998 | 7/2007 |

* cited by examiner

*Primary Examiner* — Faye Francis
(74) *Attorney, Agent, or Firm* — Brunet & Co. Ltd.; Robert A. H. Brunet

(57) ABSTRACT

In one aspect, the invention is directed to a vertical feed mixer including a hopper for holding a composition to be mixed that contains strands of feed material. A vertically oriented mixing member is positioned in the hopper, wherein the mixing member includes a helical member and a shaft and is rotatable about a vertical axis in a direction to promote an upward flow of the composition to be mixed proximate the shaft. The helical member has an outer helical edge, a cutting blade at the outer helical edge and a cutout at the outer helical edge. The cutout and the cutting blade cooperate with each other to reduce mixing power consumption and improve mixing action.

15 Claims, 6 Drawing Sheets

VERTICAL FEED MIXER HAVING CUTOUT EDGE

CROSS-REFERENCE TO RELATED APPLICATIONS

This application claims the benefit of U.S. Patent Application 61/263,047, filed Nov. 20, 2009, which is incorporated herein by reference.

FIELD OF THE INVENTION

The present invention relates to vertical shaft mixers and more specifically to vertical shaft mixers for use in mixing animal feed that contains long stringy material such as hay.

BACKGROUND OF THE INVENTION

Vertical feed mixers are known for use in mixing animal feed prior to distribution to animals. The mixers comprise a hopper within which is located a vertically oriented helical auger. The auger has a lower leading edge that rides along near the bottom of the hopper and is equipped with a plurality of cutting blades provided at discrete locations along the helical edge. The auger is typically powered using the power take off (PTO) of a tractor and is connected to the tractor by a suitable drive shaft. In operation, feed materials having varying characteristics (e.g. long hay, corn silage, soybeans, etc.) may be charged into the hopper and mixed together in any desired proportion. Use of the mixer prevents the animals (typically cattle) from feeding discriminately on select portions of their feed ration by creating a substantially homogeneous feed composition. The feed composition may be varied according to time of year, availability of economic feed materials, etc. The mixer therefore provides farmers with an opportunity to feed livestock economically and consistently, leading to optimized animal weight gain. The mixers are equipped with wheels either a side or front ejection system in order to distribute the mixed feed composition along a feeding trough as the mixer is pulled parallel to the trough. Feed can therefore be easily distributed to a large number of livestock in a feed lot.

Some feed mixers suffer from the problem of wrapping of long stringy feed materials, such as long hay or corn stalks, around the auger shaft. Past attempts to address this problem have included adding a cutting element or knife blade to the leading edge of the auger. However, the cut feed tends to be pushed outwardly against the wall of the feed hopper during this process, resulting in it being cut only once per revolution of the auger. It would be desirable to improve the cutting of the long feed materials to help improve mixing and to prevent wrapping of the long feed materials around the auger. In addition, large bales can sometimes be difficult to cut, as they tend to ride on top of the auger flight rather than being cut by the cutting element. It would also be desirable to provide these improvements while operating efficiently in terms of power consumption.

SUMMARY OF THE INVENTION

In one aspect, the invention is directed to a vertical feed mixer including a hopper for holding a composition to be mixed that contains strands of feed material. A vertically oriented mixing member is positioned in the hopper, wherein the mixing member includes a helical member and a shaft and is rotatable about a vertical axis in a direction to promote an upward flow of the composition to be mixed proximate the shaft. The helical member has an outer helical edge, a cutting blade at the outer helical edge and a cutout at the outer helical edge. The cutout and the cutting blade cooperate with each other in several ways. In one embodiment they cooperate when the cutout is leeward of the cutting blade, so that the cutout receives portions of strands that are cut by the cutting blade. In another embodiment they cooperate when the cutting blade is leeward of the cutout and the cutout is configured to wedge strands of feed material towards its trailing end so as to hold the strands at least somewhat in place for cutting by the cutting blade.

BRIEF DESCRIPTION OF THE DRAWINGS

The present invention will now be described by way of example only with reference to the attached drawings, in which.

DETAILED DESCRIPTION OF THE INVENTION

Figure 1:
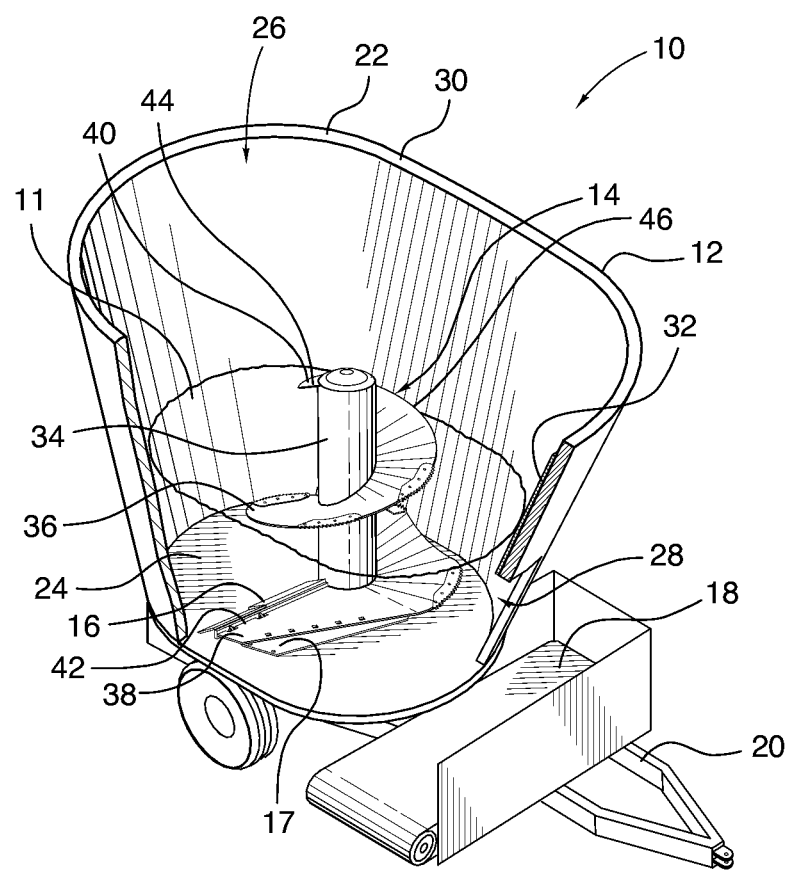
FIG. 1 is a cutaway perspective view of a vertical feed mixer in accordance with an embodiment of the present invention.

Reference is made to FIG. 1, which shows a vertical feed mixer 10 in accordance with an embodiment of the present invention. The vertical feed mixer 10 may be used for mixing an animal feed composition 11 for use in feeding to animals such as cattle and other livestock. The animal feed composition 11 is shown in FIG. 1 as being transparent to facilitate illustration of the components in the mixer 10. The animal feed composition 11 may have any suitable make up. For example, the animal feed composition 11 may include long hay, cornstalks, corn silage, soybeans, and other component materials. The feed composition 11 may also be referred to as feed material 11 herein.

The vertical feed mixer 10 includes a hopper 12, a mixing member 14, a scraper 16, a kicker 17, an outlet conveyor 18, and a support frame 20. The hopper 12 may have any suitable shape. For example, the hopper 12 may be generally capsule-shaped along a horizontal cross-sectional plane. The hopper 12 may taper progressively vertically from a relatively larger cross-sectional area at the top 22, to a relatively smaller cross-sectional area at the bottom 24. The hopper 12 could alternatively have other cross-sectional shapes instead of being capsule-shaped. For example, the hopper 12 could be generally circular in cross-section.

The top 22 of the hopper 12 may be open and may represent an inlet 26 for the introduction of an animal feed composition 11 to be mixed in the hopper 12. The hopper 12 may have an outlet, shown at 28, which is positioned on the hopper wall, shown at 30, proximate the hopper bottom 24. The outlet 28 may be covered by a cover 32 that is movable to open the outlet 28 to permit the discharge of mixed feed composition 11 from the hopper 12.

The mixing member 14 is positioned in the hopper 12 and extends generally vertically upwards from the hopper bottom 24. The mixing member 14 may include a shaft 34 that extends generally vertically, and a helical member 36 that is mounted on the shaft 34. The helical member 36 has a bottom end 38 and a top end 40. A leading edge 42 of the helical member 36 is at the bottom end 38, and a trailing edge 44 is at the top end 40. The helical member 36 has an outer helical edge 46.

Figure 1A:
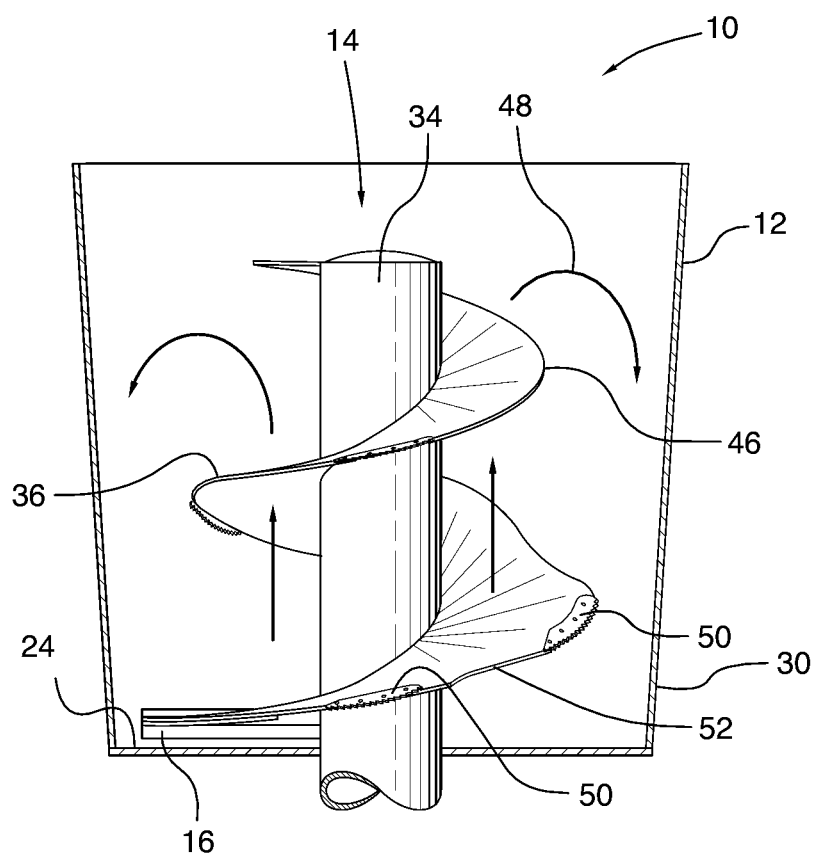
FIG. 1a is a sectional elevation view of the hopper and mixing element of the mixer shown in FIG. 1.

When the helical member 36 is rotated in the appropriate direction (clockwise in the view shown in FIG. 1), the helical member 36 may drive the animal feed composition 11 generally upwards in the middle of the hopper 12. This generates a circulation of the animal feed composition 11 in the hopper 12 as shown by the arrows 48 in FIG. 1a. With reference to FIG. 1, the helical member 36 may generally taper in the vertical direction. As can be seen in the figures, the distance from the shaft 34 to the outer helical edge 46 is larger at the bottom end 38 than it is at the top end 40.

The shaft 34 may be driven by a motor (not shown) that is positioned below the hopper bottom 24 or alternatively by a power take off (PTO) shaft (not shown) that is connected to a tractor (not shown).

At the leading edge 42 may be positioned the scraper 16. Preferably, the scraper 16 is removably connected to the helical member 36, e.g. by means of threaded fasteners, to permit the scraper 16 to be removed and replaced as necessary.

The hopper 12 and the mixing member 14 may be made from any suitable material. When the moisture content of the feed material is high enough to provide some lubrication, a steel leading edge may be used. The scraper 16 may be made from a material that is softer than the material of the hopper 12. For example, the scraper 16 may be made from a polymeric material, such as ultra-high molecular weight (UHMW) polyethylene, particularly when insufficient feed moisture is available.

Figure 2:
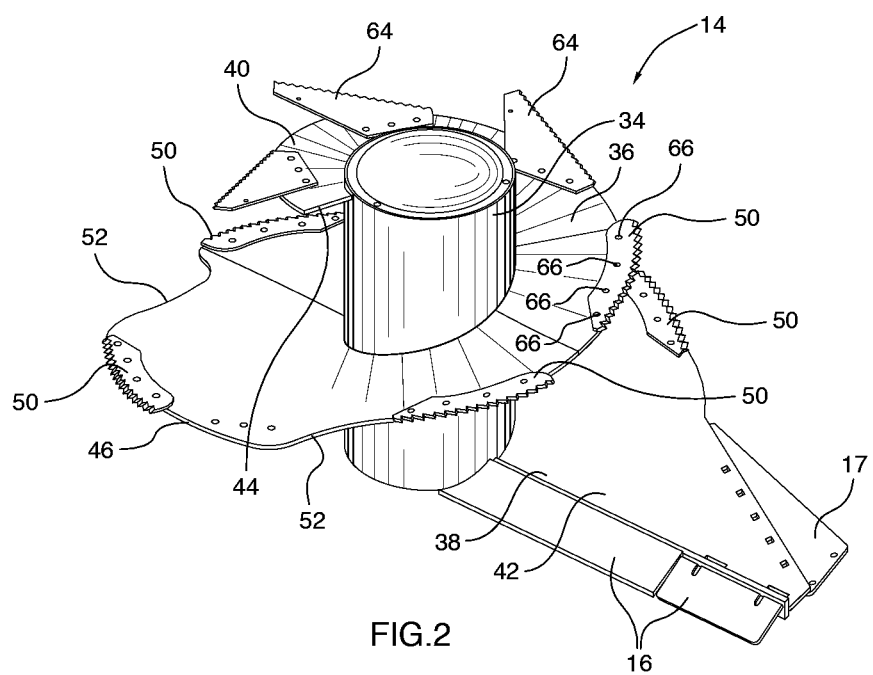
FIG. 2 is a perspective view of a mixing member from the vertical feed mixer shown in FIG. 1.
Figure 2A:
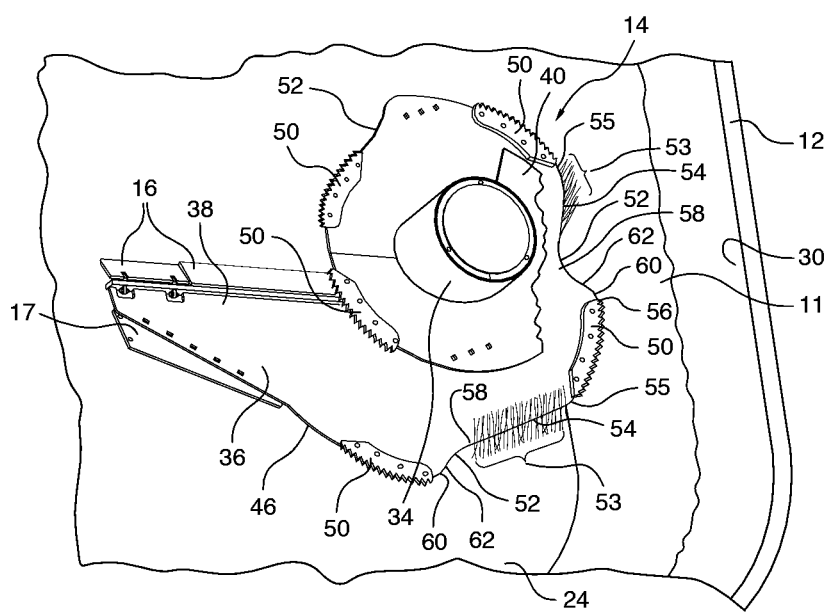
FIG. 2a is another perspective view of the mixing member from the vertical feed mixer shown in FIG. 1.

Reference is made to FIG. 2a. Along the outer helical edge 46 of the helical member 36, there is positioned an arrangement of cutting blades 50 and cutouts 52 that alternate with each other. The cutting blades 50 and cutouts 52 cooperate in several ways to perform several functions.

One way that they cooperate is that the cutouts 52 facilitate the feeding of feed composition 11 down towards the hopper bottom 24. When the hopper 12 is filled to some desired level with feed material 11, there is an increasing pressure gradient towards the bottom of the volume of feed material 11 in the hopper 12. In other words, the bottommost quantity of feed material 11 is under relatively higher pressure than the feed composition 11 above it. This is because the bottommost quantity of feed composition 11 has a relatively greater weight of feed material 11 above it. As a result, the cutting blades 50 near the bottom 38 of the mixing member 14 cut the feed composition 11 proximate the bottom 24 of the hopper 12 relatively aggressively. It is thus advantageous to circulate the feed composition 11 efficiently so as to transport the long strands of hay, cornstalks and the like, shown at 53, towards the bottom 24 so that they can receive the aggressive cutting action. During operation of a vertical shaft mixer, however, the feed composition 11 can form a layer against the hopper wall 30 that inhibits the flow of feed composition downwards, in particular inhibiting the flow of larger elements of the feed material 11, such as long strands 53. The cutouts 52 provide apertures for the passage of long strands of feed material, that are relatively less likely to become blocked with feed material 11 since they are constantly moving. The flow of long strands 53 downwards is thus improved. It is important to note however, that the cutouts 52 are not so large as to hamper the helical member 36 from transporting feed composition 11 upwardly at a suitable rate from the hopper bottom 24.

Another way that they cooperate is that, as the helical member 36 rotates, the cutouts 52 permit long strands 53 of feed composition 11 to fall through partially under gravity and as part of the downward flow of feed composition 11 proximate the hopper wall 30. As the helical member 36 continues to rotate, the trailing portion (shown at 54) of the cutout 52 is preferably positioned at a shallow angle (such as an angle of up to about 40 degrees) relative to the outer helical edge 46 so that the strands 53 are gradually wedged along the hopper wall 30 by the rotation of the helical member 36. At the trailing end (shown at 55) of the cutout 52, the wedged strands 53 encounter a cutting blade 50, which is also preferably angled at a shallow angle (such as an angle of up to about 8 degrees) relative to the outer helical edge 46 of the helical member 36 (not necessarily the same angle as the trailing portion 54 of the cutout 52 however). As the helical member 36 continues to rotate, the strands 53 are brought into engagement with the cutting blade 50, which cut at least some of the strands 53. The wedging of the strands 53 in the trailing portion 54 of the cutout 52 contributes to holding the strands 53 at least somewhat in place so that the cutting blade 50 cuts through them rather than simply pushing them rotationally forward without cutting them.

For greater certainty, the angular ranges of up to about 40 degrees and up to about 8 degrees for the cutout 52 and for the cutting blade 50 respectively are exemplary only. Other exemplary ranges include from 1 to 40, from 5 to 35, or from 10 to 30 degrees for the cutout 52 and from 1 to 8, from 2 to 7 and from 3 to 6 for the cutting blade 50. It is possible that in other embodiments, other limits to the aforementioned angular ranges are possible. For example, it may be possible in some embodiments to position a cutting blade 50 at an angle of greater than 8 degrees.

The cutting carried out by the cutting blade 50 is gradual due to its shallow angle with respect to the outer helical edge 46. In other words, the cutting blade 50 is dragged across the strands 53, instead of punching through the strands 53 as would happen if the cutting blade 50 were significantly more radially oriented. The dragging action consumes less power than the aforementioned punching action. To improve the cutting that is carried out by the cutting blade 50, the cutting blade 50 may optionally be serrated. Furthermore, orienting the trailing portion 54 of the cutout 52 and the cutting blade 50 at the aforementioned shallow angles in accordance with an embodiment of the invention, provides them with a relatively low drag shape, as compared to some cutting blades of the prior art that extend nearly radially outwardly from the helical member. It will also be noted that, since the cutouts 50 effectively reduce the surface area of the helical member, the drag on the helical member 36 produced from frictional contact with the feed material 11 is reduced as compared to an equivalent helical member that does not have the cutouts 52. As a result of the reduced drag and the dragging type of cutting taking place relatively less power is required to rotate the mixing member 14 than would be required if these features were not provided.

Once the strands 53 are cut, lower portions of the cut strands 53 continue to flow downwardly so as to potentially undergo further, more aggressive cutting under higher pressure by other cutting blades 50 further down in the hopper 12. By positioning another cutout 52 (which may be referred to as a second cutout 52) leeward of and proximate the trailing end of the cutting blade 50, shown at 56, the upper portions of the cut strands 53 can also continue to flow downwardly (i.e. through the second cutout 52) so as to receive further cutting under higher pressure from cutting blades 50 positioned further down in the hopper 12. Furthermore, the upper portions of the cut strands 53 may undergo further cutting when passing through the second cutout 52 if there is another cutting blade 50 (i.e. a second cutting blade 50) proximate the trailing end 55 of the second cutout 52.

A problem that can occur with typical vertical shaft mixers relates to how some materials are introduced into the mixer. Long strand material 53, such as hay, may be introduced into the mixer in the form of a bale or in the form of large pieces of bale. As such, the bale or large pieces thereof can ride on the helical member of the mixer without getting broken up. This can delay the cutting of the long strand material 53 into appropriately short lengths and the mixing of the long strand material 53 into the composition in the mixer to form a homogenous feed composition. However, in a mixer according to an embodiment of the present invention, as portions of the bale or portions of the large pieces of bale pass through the cutouts 52, the edges of the cutouts 52 and the cutting blades 50 that are leeward of the cutouts 52 help to break or cut long strand material 53 from the bales or from the large pieces of bale, thereby hastening the cutting and mixing process.

In the uppermost portion of the helical member 36, there is a relatively large clearance between the outer helical edge 46 and the hopper wall 30. As a result of the large clearance, there is relatively little obstruction to the downward flow of feed composition 11 and to the long strands 53 in the feed composition 11. As a result, the uppermost portion of the helical member 36 may optionally not have cutouts 52. Alternatively, cutouts 52 may be provided to help break up bales of hay and the like, or pieces from a bale, that are being fed into the mixer 10, as described above. As shown in FIG. 2a, such cutouts 52 could be relatively smaller than the cutouts 52 provided in the lower portions of the helical member 36 because the cutouts 52 on the uppermost portion of the helical member 36 are not needed to promote the downward flow of long strands 53 in the feed composition. By providing relatively smaller cutouts 52 in the uppermost portion of the helical member 36, more of the surface area of the uppermost portion of the helical member 36 remains available to help transport feed composition upwards. Furthermore, relatively small cutouts 52 are still effective at breaking up bales of hay and the like, or pieces thereof.

Along portions of the helical member 36 where the outer helical edge 46 is relatively closer to the wall 30, the cutouts 52 may be relatively larger in size (i.e. area). This is because these cutouts 52 are relatively more important in terms of providing a flow path downwards for the long strands 53 of feed material 11.

Separately from the overall size (i.e. area) of the cutouts 52, other properties of the cutouts 52 may be varied depending on their location on the helical member 36. For example, the cutouts 52 each have a point of maximum depth shown at 58, which is the point in the cutout 52 that is closest radially to the shaft 34. The depth of each cutout 52 is the radial distance from the point of maximum depth 58 to where the outer helical edge 46 of the helical member 36 would be if the cutout 52 were not provided. The depth of the cutouts 52 is generally greater along portions of the helical member 36 where there is less clearance with the wall 30 of the hopper 12, thereby facilitating the flow of long strands 53 of feed material 11 towards the hopper bottom 24.

The length of the cutouts 52 may be approximately the same length as the cutting blades 50.

The shape of the cutouts 52 may be any suitable shape. For example, the cutouts 52 may be generally arcuate. The point of maximum depth 58 of each cutout 52 may be positioned forward of the center of the cutout 52, towards the leading end, shown at 60. In other words, the leading portion of the cutout 52 (shown at 62) may transition relatively more quickly from the point of maximum depth 58 out to the helical contour, than does the trailing portion 54. The point of maximum depth may occur at a concave portion of the cutout 52. The shape of the cutouts 52 may be varied depending on their location along the helical member 36. The trailing portion 54 may comprise a compound curve with both concave and convex portions. The trailing portion 54 may transition smoothly (without corners) towards the outer helical edge 46. The leading portion 62 may be shorter in length than the trailing portion 54. The cutout 52 may be located immediately leeward of a cutting blade 50. Alternatively, the cutting blade 50 may be located immediately leeward of a cutout 52. There may be a plurality of cutting blades 50 and at least one cutout 52. The cutout 52 may be located between two cutting blades 50. There may be a plurality of cutouts 52. The plurality of cutouts 52 may be interspersed with the plurality of cutting blades 50 in order to alternate with the cutting blades 50 along the helical edge 46. The distance between the cutouts 52 and the cutting blades 50 may also be varied depending on the location of the cutout 52 along the helical member 36 and depending upon the distance between the helical edge 46 and the hopper wall 30.

In tests, it was found that the mixing element 14 mixed animal feed composition 11 with relatively more (approximately 20%) mixing action, and it cut the hay in the feed composition 11 more quickly than a mixing element that did not have the arrangement of cutouts 52 and cutting blades 50. The mixing element 14 was found to maintain (or not increase) the tractor horsepower requirements as compared with a mixing element without the cutouts 52, despite the increase in mixing action. Depending on the feed composition, in certain cases there was about a 5-8% reduction in power consumption for the mixing element 14. Another use or advantage of the mixing element 14 is therefore in reducing mixing power requirements, since to the present invention requires less power to obtain the same degree of mixing action as prior art mixing elements lacking the cutouts 52.

With reference to FIG. 2, it will be noted that the uppermost portion of the helical member 36 may have additional cutting blades thereon, shown at 64. The cutting blades 64 have a relatively greater angle with respect to a tangent to the outer helical edge 46 (although they are angled significantly less than radially), than the blades 50 on the lowermost portion of the helical member 36. The greater angle provides relatively greater reach for cutting though the feed composition about the uppermost portion of the helical member 36. Because of the large amount of clearance between that portion of the helical member 36 and the hopper wall 30, and because the angles of the cutting blades 64 are significantly less than radial, they do not add significantly to the overall power required to rotate the mixing member 14. However, if blades of this type or having this angle were provided along the entire length of the helical member 36, they would be expected to increase power consumption due to the need to "punch" rather than "slice" through the feed composition.

Figure 3A:
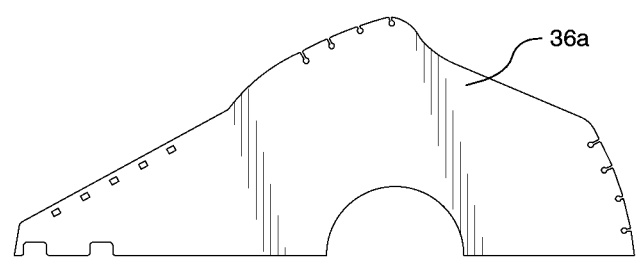
FIGS. 3a-3c are plan views of elements that make up the helical member on the mixing member shown in FIG. 2.
Figure 3B:
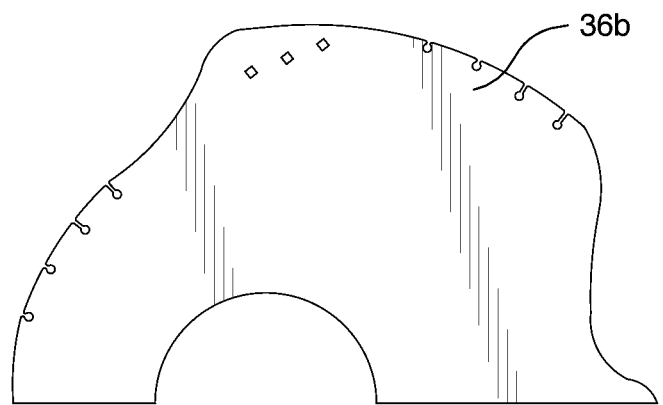
Figure 3C:
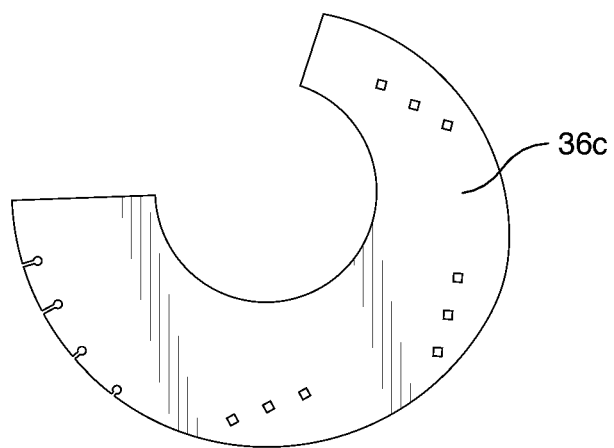

The constituent flight elements that make up the helical member 36 are shown at 36a, 36b and 36c in FIGS. 3, 3b and 3c respectively. These constituent flight elements are welded or otherwise joined to the shaft 34 (FIG. 2) and to each other so as to form an integral element.

With reference to FIG. 2, the cutting blades 50 are preferably removably connected to the helical member 36 by any suitable means, such as by mechanical fasteners, such as bolts and nuts, so that they can be removed and replaced after they are worn. Alternatively, however, they may be permanently mounted to the helical member 36 by some means such as be welding. In embodiments wherein the cutting blades 50 are mounted using mechanical fasteners such as bolts and nuts, the helical member 36 may include slotted fastener apertures 66 to facilitate the mounting of cutting blades 50 thereon that already have bolts thereon with nuts loosely mounted on the ends of the bolts.

While the above description constitutes a plurality of embodiments of the present invention, it will be appreciated that the present invention is susceptible to further modification and change without departing from the fair meaning of the accompanying claims.

The invention claimed is:

1. A vertical feed mixer comprising:
    a) a hopper for holding a composition to be mixed; and,
    b) a vertically oriented mixing member positioned in the hopper, wherein the mixing member includes a helical member and a shaft and is rotatable about a vertical axis in a direction to promote an upward flow of the composition to be mixed proximate the shaft, wherein the helical member has an outer helical edge, a cutting blade along the outer helical edge and a cutout along the outer helical edge, wherein the cutout has an arcuate shape and provides an aperture for passage of the composition.

2. The vertical feed mixer according to claim 1, wherein the cutout comprises a concave portion and a convex portion.

3. The vertical feed mixer according to claim 2, wherein the cutout has a cutout trailing portion, the cutout trailing portion comprising the convex portion and merging smoothly with the outer helical edge.

4. The vertical feed mixer according to claim 1, wherein the cutout comprises a cutout leading end, a cutout trailing end, a leading portion proximal the leading end and a trailing portion proximal the trailing end, the maximum distance between the cutout and the hopper wall being closer to the leading end and defining a nexus between the leading portion and the trailing portion.

5. The vertical feed mixer according to claim 4, wherein the trailing portion has a greater length than the leading portion.

6. The vertical feed mixer according to claim 1, wherein the cutting blade has an angle of from 0 to 8 degrees with respect to a tangent from the outer helical edge.

7. The vertical feed mixer according to claim 1, wherein the angle is from greater than 0 to 8 degrees.

8. The vertical feed mixer according to claim 1, wherein the cutout has an angle of from 0 to 40 degrees with respect to a tangent from the outer helical edge.

9. The vertical feed mixer according to claim 8, wherein the angle is from greater than 0 to 40 degrees.

10. The vertical feed mixer according to claim 1, wherein there are a plurality of cutting blades and at least a cutout between two cutting blades.

11. The vertical feed mixer according to claim 10, wherein there is a plurality of cutouts alternating with the plurality of cutting blades along the helical edge.

12. The vertical feed mixer according to claim 11, wherein there are at least three cutouts.

13. The vertical feed mixer according to claim 12, wherein there are at least four cutting blades.

14. The vertical feed mixer according to claim 1, wherein there is a cutout immediately leeward of a cutting blade.

15. The vertical feed mixer according to claim 1, wherein there is a cutting blade immediately leeward of a cutout.

* * * * *